Aug. 22, 1950     F. W. MERRILL     2,519,919
DYNAMOELECTRIC MACHINE
Filed June 17, 1949
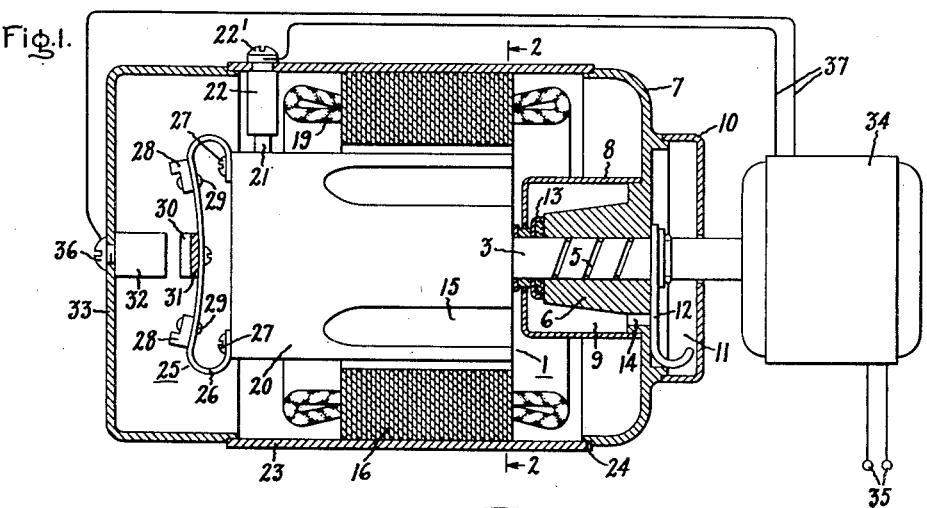
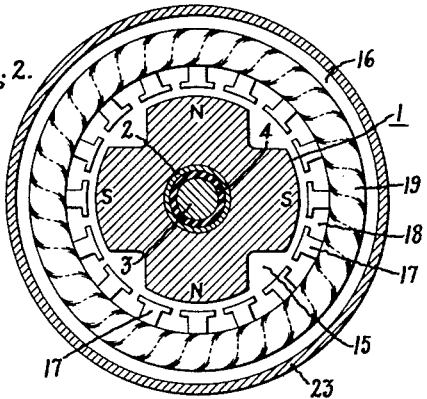
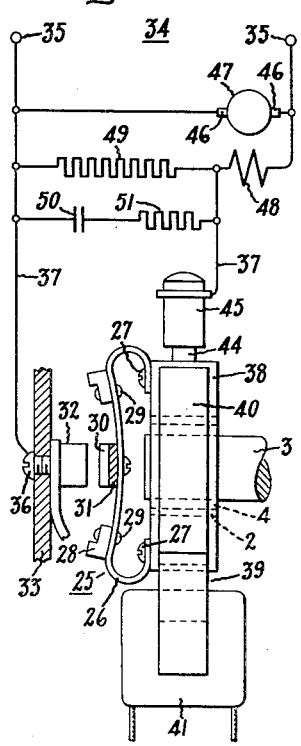
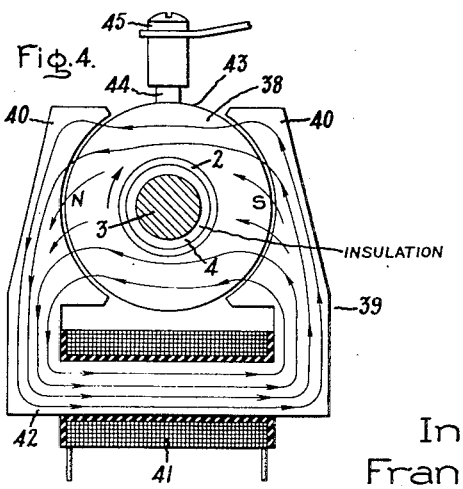
Inventor:
Frank W. Merrill,
by Purcell & Mack
His Attorney.

Patented Aug. 22, 1950

2,519,919

UNITED STATES PATENT OFFICE 2,519,919

DYNAMOELECTRIC MACHINE

Frank W. Merrill, Fort Wayne, Ind., assignor to General Electric Company, a corporation of New York Application June 17, 1949, Serial No. 99,705

5 Claims. (Cl. 322—30)

This invention relates to dynamoelectric machines and more particularly to machines having permanent magnet rotors.

Many dynamoelectric machines, particularly in the fractional horsepower frame sizes, are provided with rotors including a permanent magnet for furnishing the exciting flux. The permanent magnet excited type of dynamoelectric machine is particularly applicable to small alternating current generators of the type used for aircraft applications. It is often necessary to arrange such a permanent magnet alternating current generator so that a substantially constant output frequency is produced regardless of the load or the line voltage on the driving motor. Assuming that the driving motor is of the shunt direct current type, this substantially constant frequency may be obtained by applying a speed regulating device to the motor, which is usually arranged to increase the field current to decrease the speed and to decrease the field current to increase the speed. These speed controlling arrangements frequently employ a vibratory centrifugal speed regulator of the type described in Patent 1,795,240, Ulmer. Regulators of this type require a slip ring which is usually incorporated in the motor structure.

It has been found that the permanent magnet material used in permanent magnet rotors of dynamoelectric machines, particularly the group of iron base alloys including substantial percentages of aluminum, nickel, and cobalt, is applicable for use as slip ring material, as described in my copending application Serial No. 94,284, filed May 20, 1949, and assigned to the assignee of this application. It has, therefore, been found practicable to utilize the permanent magnet rotor of dynamoelectric machine as a slip ring, thus obviating the necessity for providing a separate slip ring.

An object of this invention is to provide an improved permanent magnet excited dynamoelectric machine wherein the permanent magnet is also utilized as a slip ring.

Another object of this invention is to provide an improved speed regulated permanent magnet excited dynamoelectric machine, wherein the permanent magnet is also utilized as a slip ring.

A further object of this invention is to provide an improved motor-generator combination.

Further objects and advantages of this invention will become apparent and the invention will be better understood by reference to the accompanying description and drawings. The features of novelty which characterize this invention will be pointed out with particularity in the claims annexed to and forming a part of this specification.

In accordance with one aspect of this invention, there is provided a generator having a permanent magnet rotor member with a cylindrical surface portion forming a current collector surface. A contact brush is arranged in sliding engagement with the current collector surface of the permanent magnet and an axially vibratory contact is mounted on the permanent magnet. The stationary contact associated with the axially vibratory contact and the brush member are arranged in the speed controlling circuit of the motor which drives the generator rotor.

In the drawing, Fig. 1 is a side elevational view, partly in section, of the improved permanent magnet excited dynamoelectric machine of this invention; Fig. 2 is a cross-sectional view taken along the line 2—2 of Fig. 1; Fig. 3 is a side elevational view of a modification of this invention also showing the field circuit arrangement for regulator control of the driving motor and Fig. 4 is an end view of Fig. 3.

Referring now to Figs. 1 and 2, there is shown a generator having a permanent magnet rotor member 1 preferably cast around a soft steel sleeve 2 which in turn is mounted on a rotatable shaft 3 with insulating tube 4 between the shaft 3 and sleeve 2 to insulate the magnet rotor from ground. The shaft 3, which is provided with lubricant pumping grooves 5, is rotatably supported by bearing 6 formed on end shield 7. A cup member 8 is positioned surrounding the bearing 6 to form a lubricant reservoir 9 and another cup member 10, apertured to receive the shaft 3, is mounted on the exterior of the end shield 7 and forms a lubricant reservoir 11. A wick of absorbent material 12 is positioned in the lubricant reservoir 11 and serves to feed the lubricant to the journal surface of the shaft 3 where it is pumped through the bearing by the pumping grooves 5. The lubricant which passes through the bearing is thrown centrifugally by lubricant thrower 13 into the reservoir 9 and is returned to the lubricant reservoir 11 through opening 14.

The permanent magnet 1 is polarized radially to form polar areas at its outer surface, as shown in Fig. 2, and the interpolar areas are cored out as shown at 15. A stator member 16 formed of a plurality of relatively thin laminations of magnetic material is provided having a plurality of teeth 17 extending radially inward to embrace the permanent magnet 1. The teeth 17 define winding slots 18 in which a suitable winding 19 is positioned. The permanent magnet 1 is provided with a cylindrical portion 20 extending axially beyond the stator member 16, the cored out interpolar portions 15 only extending under the stator member. The axial extension 20 of the permanent magnet forms a current collector surface, and a brush member 21 mounted in a suitable brush holder 22 is arranged in sliding engagement with this current collector surface. The stator member 16 is mounted in a shell member 23 to which the end shield 7 is secured by a suitable rabbet joint as at 24. The brush holder 22 is secured to the shell 23 by a suitable insulating connection and is provided with a terminal 22'.

A centrifugal, axially vibratory, center contact mechanism 25 is provided having a spring member 26, secured to the end of the permanent magnet 1 in any suitable manner, as by screws 27, threaded into soft steel inserts cast into the magnet (not shown) and weight members 28 secured to the spring member 26 in any suitable manner, as by rivets 29. The movable contact 30 mounted on a steel base 31, is attached to the spring 26 by riveting over a turned down center portion of the base as shown. A stationary contact 32 is associated with the movable contact 30 and is secured to the end shield 23 by any suitable insulating connection or in certain applications may be grounded to the end shield. The rotor member 1 is driven through shaft 3 by a suitable electric motor 34 which is energized from an external source of power through lines 35. The terminal 22' of the brush 21 and the terminal 36 of the stationary contact 32 are arranged in the speed control circuit of the motor 34 through lines 37.

It will now be readily apparent that there is here provided an arrangement wherein a speed regulating device is mounted on the generator rather than on the motor, the permanet magnet serving as a slip ring eliminating the necessity for providing a separate slip ring for the motor.

Referring now to Figs. 3 and 4 in which like elements are indicated by like reference numerals, there is shown a permanent magnet excited generator having a cylindrical permanent magnet rotor 38, polarized radially as shown in Fig. 4, cast around a soft steel sleeve member 2 which in turn is mounted on the shaft 3 with insulating tube 4 between the shaft 3 and the sleeve 2. The shaft 3 is adapted to be driven by a shunt motor direct current 34 as described above. A stator member 39 is provided having a pair of field poles 40 embracing the permanent magnet 38 and a suitable winding 41 is mounted on the base portion 42 of the stator member 39. The circumferential surface 43 of the permanent magnet 38 forms a current collector surface which is slidingly engaged by a brush member 44 intermediate the polar projections 40. The brush member 44 is mounted in a suitable brush holder 45. A centrifugal axially vibratory center contact mechanism 25 is provided having a spring member 26 secured to the face of the permanent magnet 38 by screws 27 which may be threaded into steel insert pins (not shown) cast into the face of the permanent magnet 38. Weight members 28 are secured to the spring member 26 by rivets 29. Movable contact 30 is secured to the center of the spring member 26 by the riveted-over center portion of a soft metal base 31 to which the contact 30 is brazed or welded. Stationary contact 32 is arranged to cooperate with the movable contact 30. The stationary contact 32 and the brush holder 45 are adapted to be connected in the speed control circuit of the driving motor 34 as will now be described.

While the driving motor 34 may be of any type having a speed regulating circuit, a shunt direct current motor is particularly applicable and as shown in Fig. 3, the brushes 46, which contact the commutator 47, are arranged across the lines 35. The shunt field 48 and regulator resistance 49 are arranged across the brushes 46. The lines 37 connect the stationary contact 32 and the movable contact 30 across the regulator resistance 49. A contact protection circuit including a capacitor 50 and a small resistor 51 is also arranged in parallel with the regulator contacts and the resistor 49. It will now be readily seen that an increase in speed of the driving motor 34 will cause the contacts 30 and 32 to close short-circuiting the regulator resistor 49 thus increasing the current flow through the shunt field 48 and reducing the motor speed. Conversely, a decrease in speed which causes the contacts 30 and 32 to open again places the resistance 49 in series with the shunt field 48 reducing the current flow through the field and increasing the speed.

It should be noted that in the construction of Figs. 1 and 2, the brush 21 contacts an outer surface 20 of the permanent magnet 1 axially displaced from the stator; whereas in Figs. 3 and 4, the brush 44 contacts the polarized surface of the permanent magnet 38.

It will now be readily apparent that this invention provides a dynamoelectric machine having a permanent magnet rotor wherein the permanent magnet is also utilized as a current collector. While this invention has been shown as applied to a generator, it is readily apparent that it is applicable to any dynamoelectric machine having a permanent magnet rotor where a slip ring is also desired.

While I have shown and described specific embodiments of this invention, further modifications and embodiments will occur to those skilled in the art. I, therefore, desire that it be understood that this invention is not limited to the specific embodiments shown, and I intend in the appended claims to cover all modifications within the spirit and scope of this invention.

What I claim as new and desire to secure by Letters Patent of the United States is:

1. In combination, a generator having a rotor member including a permanent magnet polarized radially to form polar areas at its outer surface for furnishing unidirectional exciting flux therefor said permanent magnet having a cylindrical portion forming a current collector surface, a brush member slidingly engaging said current collector surface of said permanent magnet, an electric motor for driving said rotor member, speed responsive means mounted on said rotor, a pair of contacts adapted to be opened and closed by said speed responsive means, one of said contacts being electrically connected to said magnet whereby a circuit is completed from said brush to said one contact; said brush member and the other of said contacts being arranged in a circuit of said motor.

2. In combination, a generator having a rotor member including a permanent magnet polarized radially to form polar areas at its outer surface for furnishing unidirectional exciting flux therefor said permanent magnet having a cylindrical portion forming a current collector surface, a brush member slidingly engaging said current collector surface of said permanent magnet, an electric motor for driving said rotor member, an axially movable vibratory contact mounted on an axial end of said rotor member and a stationary contact cooperating with said axially movable contact, said axially movable contact being electrically connected to said magnet whereby a circuit is completed from said brush to said axially movable contact, said brush member and said stationary contact being connected in the speed control circuit of said motor.

3. In combination, a generator having a rotor member including a permanent magnet polarized radially to form polar areas at its outer surface for furnishing unidirectional exciting flux therefor, said permanent magnet having a cylindrical portion forming a current collector surface, a brush member slidingly engaging said current collector surface, an electric motor for driving said rotor member, an axially movable vibratory contact on said rotor member, said axially movable contact being electrically connected to said magnet whereby a circuit is completed from said brush to said axially movable contact, and a stationary contact cooperating with said axially movable contact, said brush member and said stationary contact being arranged in the speed control circuit of said motor.

4. In combination, a generator having a rotor member including a permanent magnet polarized radially to form polar areas at its outer surface for furnishing unidirectional exciting flux therefor, a stator member with a winding and a plurality of field poles embracing said rotor, said permanent magnet having a cylindrical portion extending axially beyond said poles forming a current collector surface, a brush member slidingly engaging said current collector surface, an electric motor for driving said rotor, an axially movable vibratory contact on said rotor member, said axially movable contact being electrically connected to said magnet whereby a circuit is completed from said brush to said axially movable contact, and a stationary contact cooperating with said axially movable contact, said brush member and said stationary contact being arranged in the speed control circuit of said motor.

5. In combination, a generator having a rotor member including a cylindrical permanent magnet polarized radially to form polar areas at its outer surface for furnishing unidirectional exciting flux therefor, a stator member with a winding and at least a pair of field poles embracing said permanent magnet, a brush member slidingly engaging the cylindrical surface of said permanent magnet intermediate two of said poles, said cylindrical surface of said permanent magnet forming a current collector surface, an electric motor for driving said rotor, an axially movable vibratory contact on said rotor member, said axially movable contact being electrically connected to said magnet whereby a circuit is completed from said brush to said axially movable contact, and a stationary contact cooperating with said axially movable contact, said brush member and said stationary contact being arranged in the speed control circuit of said motor.

FRANK W. MERRILL.

No references cited.